Patented June 16, 1953

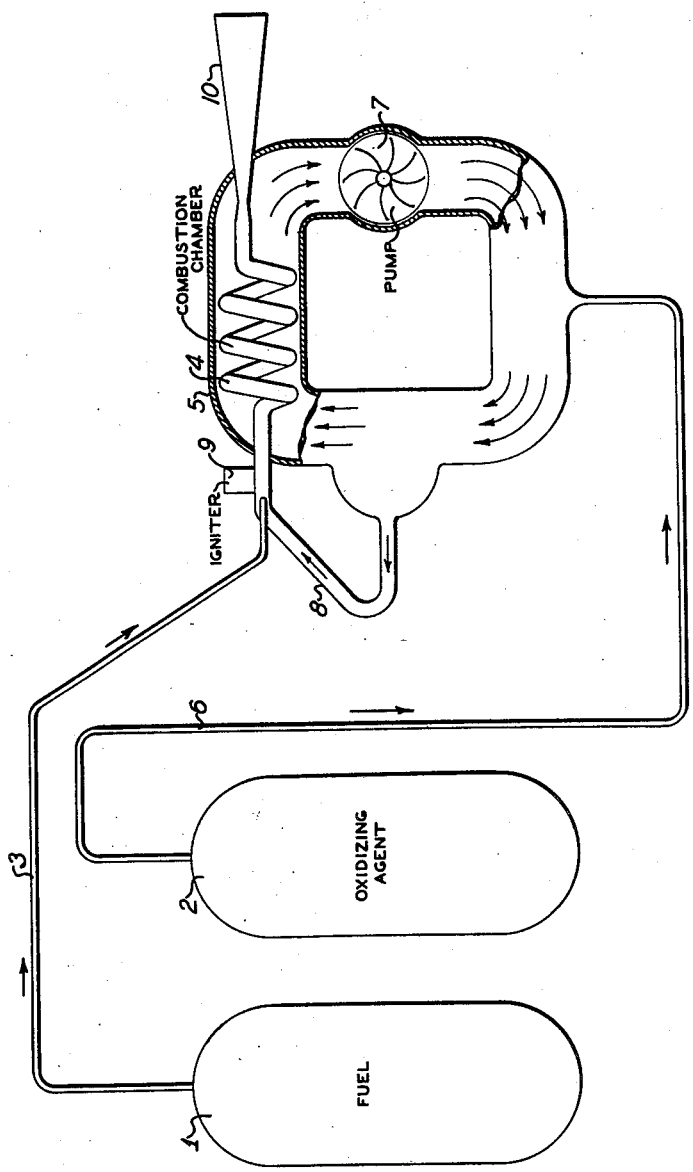

2,641,904

UNITED STATES PATENT OFFICE 2,641,904

APPARATUS FOR COOLING COMBUSTION CHAMBERS OF MOVABLE POWER PLANTS WITH AN OXIDIZING AGENT

Maurice Bouffart, Brussels, Belgium

Application January 28, 1946, Serial No. 643,926
In Great Britain December 14, 1945

3 Claims. (Cl. 60—39.66)

The present invention relates to a movable power plant in which the combustion chamber is located in a heat exchanger, the cooling fluid of which may be the oxidizing agent or the fuel is submitted to a high speed circulation in said cooler, prior to its passage to the combustion chamber.

In a power plant according to the invention, internal means are provided in the heat exchanger so as to cause a rapid flow of the oxidizing agent in a closed circuit. The plant is so arranged that the mass of oxidizing agent delivered to the combustion chamber is continuously renewed through a pipe from the receptacle containing said agent, that is to say, in a plant according to the invention, receptacles containing a fuel and an oxidizing agent are connected through pipes respectively to the combustion chamber and to the heat exchanger; this heat exchanger is in heat exchange relation with the combustion chamber.

In such an arrangement, the rate of flow of the oxidizing agent in closed circuit in the heat exchanger is much higher than the rate of flow of said agent entering and leaving said exchanger.

The invention will be more clearly understood by reference to the accompanying drawing. Without limiting the scope of the invention, the single figure is a diagrammatic representation of a movable power plant according to the invention in the form of a jet engine.

In the drawing, reference numerals 1 and 2 designate receptacles for fuel and oxidizing agents respectively. A pipe 3 leads the fuel to a combustion chamber 4 represented in the form of a helically wound tube and which is located in a cooler or heat exchanger 5 to which the oxidizing agent serving as cooling fluid is led from receptacle 2 through a pipe 6. It need hardly be said that this representation is not limitative and, for example, that said combustion chamber can also be that of a reciprocating engine. In said heat exchanger, the oxidizing agent is forced in a closed cycle at high speed by means of a pump 7 driven to produce a rapid cooling of said combustion chamber. After having circulated in the exchanger 5, the oxidizing agent which has undergone a change of phase by its absorption of heat in said exchanger, is led through a pipe 8 to the combustion chamber 4, where combustion occurs due to the ignition means 9.

The mass of oxidizing agent delivered to the combustion chamber is continuously renewed through the pipe 6 from the receptacle 2 for said agent. In the heat exchanger, the rate of flow of the oxidizing agent is much higher than the rate of flow of said agent entering and leaving said exchanger.

As to said agent, it will generally be air compressed to a few hundred atmospheres, or liquid air more or less rich in oxygen.

The hot gases from the combustion chamber are led away through one or more nozzles 10. In the embodiment represented, the hot gases act directly by their kinetic power so that the power plant described relates to a jet propelled or reaction engine.

The fuel can be a liquid such as gasoline or a gas advantageously compressed to a few hundred atmospheres.

It is to be understood that the hot gases can also act upon turbine blades such as that of a gas turbine.

What I claim is:

1. A power plant comprising a combustion chamber, a cooling jacket surrounding said combustion chamber and having an inlet and an outlet for a cooling medium, conduit means connecting the inlet and outlet of said jacket and forming a closed flow path with said jacket, a receptacle containing a liquefied gaseous oxidizing agent, a receptacle containing a fuel under high pressure, a pipe leading from the oxidizing agent receptacle to said closed flow path, a pipe leading from the fuel receptacle to said combustion chamber, a pipe leading gaseous oxidizing agent which has changed from the liquid to gaseous phase in the closed flow path by absorption of heat, from the closed flow path to the combustion chamber, and a rotary pump within said closed flow path for circulating the oxidizing agent through said closed flow path and in heat exchange relation about said combustion chamber at a rate of flow much higher than the rate of flow of the oxidizing agent entering and leaving said closed flow path.

2. A power plant comprising a combustion chamber, a cooling jacket surrounding said combustion chamber and having an inlet and an outlet for a cooling medium, conduit means connecting the inlet and outlet of said jacket and forming a closed flow path with said jacket, a receptacle containing liquid air, a receptacle containing a fuel under high pressure, a pipe leading from the liquid air receptacle to said closed flow path, a pipe leading from the fuel receptacle to said combustion chamber, a pipe leading gaseous air which has changed from the liquid to gaseous phase in the closed flow path by absorption of heat, from the closed flow path to the combustion chamber, and a rotary pump within said closed flow path for circulating the air through said closed flow path and in heat exchange relation about said combustion chamber at a rate of flow much higher than the rate of flow of the air entering and leaving said closed flow path.

3. A power plant comprising a combustion chamber, a cooling jacket surrounding said combustion chamber and having an inlet and an outlet for a cooling medium, conduit means connecting the inlet and outlet of said jacket and forming a closed flow path with said jacket, a receptacle containing a liquefied gaseous oxidizing agent, a receptacle containing a fuel under high pressure, a pipe leading from the oxidizing agent receptacle to said closed flow path, a pipe leading from the fuel receptacle to said combustion chamber, a pipe leading gaseous oxidizing agent which has changed from the liquid to gaseous phase in the closed flow path by absorption of heat, from the closed flow path to the combustion chamber, a rotary pump within said closed flow path for circulating the oxidizing agent through said closed flow path and in heat exchange relation about said combustion chamber at a rate of flow much higher than the rate of flow of the oxidizing agent entering and leaving said closed flow path.

MAURICE BOUFFART.

References Cited in the file of this patent

UNITED STATES PATENTS

| Number | Name | Date |
|---|---|---|
| 94,978 | Russel | Sept. 21, 1869 |
| 1,448,899 | Cole | Mar. 20, 1923 |
| 1,846,955 | Dow | Feb. 23, 1932 |
| 1,972,356 | Pfleiderer | Sept. 4, 1934 |
| 1,997,229 | Noack | Apr. 9, 1935 |
| 2,015,883 | Carlson | Oct. 1, 1935 |
| 2,086,553 | Holzwarth | July 13, 1937 |
| 2,087,972 | Heller | July 27, 1937 |
| 2,280,765 | Anxionnaz | Apr. 21, 1942 |
| 2,332,866 | Müller | Oct. 26, 1943 |
| 2,392,622 | Traupel | Jan. 8, 1946 |
| 2,398,654 | Lubbock | Apr. 16, 1946 |
| 2,408,111 | Truax et al. | Sept. 24, 1946 |
| 2,434,298 | Truax | Jan. 13, 1948 |
| 2,466,723 | Mercier | Apr. 12, 1949 |
| 2,496,710 | Goddard | Feb. 7, 1950 |
| 2,502,941 | Giger et al. | Apr. 4, 1950 |
| 2,558,483 | Goddard | June 26, 1951 |